United States Patent [19]

Tulai

[11] Patent Number: 5,400,365
[45] Date of Patent: Mar. 21, 1995

[54] ISK RECEIVER

[75] Inventor: Alexander F. Tulai, Nepean, Canada

[73] Assignee: Mitel Corporation, Kanata, Canada

[21] Appl. No.: 922,616

[22] Filed: Jul. 30, 1992

[51] Int. Cl.⁶ .......................................... H04L 27/14
[52] U.S. Cl. ........................................ 375/88; 375/94
[58] Field of Search ...................... 375/88, 89, 90, 91, 375/94; 329/300, 303; 455/214; 340/825.58

[56] References Cited

U.S. PATENT DOCUMENTS

| | | | |
|---|---|---|---|
| 4,291,275 | 9/1981 | Nossen | 375/89 |
| 4,568,882 | 2/1986 | Single | 375/88 |
| 4,752,742 | 6/1988 | Akaiwa | 375/88 |

FOREIGN PATENT DOCUMENTS 2124046  2/1984  United Kingdom ................... 375/88

Primary Examiner—Stephen Chin
Attorney, Agent, or Firm—Laff, Whitesel, Conte & Saret, Ltd.

[57] ABSTRACT

A class message receiver that in one embodiment can be implemented in a Digital Signal Processor. An FSK demodulator takes input linear samples of the signal and filters them with a bandpass filter which does an upsampling to increase the sampling rate from 8,000 Hz to 24,000 Hz, which results in 20 samples at the output of the bandpass filter for each incoming data bit. The amplitude of the signal/samples at the output of the bandpass filter is adjusted by an automatic gain control (AGC) circuit and the resulting samples (for convenience referred as sample (t), where t is a discrete moment in time) are processed along two different paths designed to estimate the likelihood of the input signal encoding a mark (mark estimation path) or a space (space estimation path).

19 Claims, 3 Drawing Sheets

ISK RECEIVER

FIELD OF THE INVENTION

This invention relates to telephony, and in particular to a digital receiver for receiving data sent by a Stored Program Control Switching System (SPCS) usually called CLASS messages.

BACKGROUND TO THE INVENTION

CLASS messages are usually transmitted over a voice transmission path during the silent interval between the first and second power ringing signals, to customer premises equipment (CPE). The transmission scheme used is analog, phase-coherent frequency shift keying (FSK) with logical 1's (marks) modulated by 1200±12 Hz and logical 0's (spaces) modulated by 2200±22 Hz. This binary data is sent serially in an asynchronous way at a rate of 1200 bits per second (1200 baud).

Typically, a peripheral of the CPE receiving the data uses a digital to analog (D/A) converter called a CODEC. CODECs which sample analog signals at a fixed rate of 8,000 Hz are relatively inexpensive and are consequently preferred over more complex CODECs having selectable sampling rates. The output of the CODEC is a compounded 8 bit value which could be expanded (in hardware or software) to a linear value with one sign bit and 12 bits (for Europe) or 13 bits (for North America) for magnitude.

SUMMARY OF THE INVENTION

The present invention is a class message receiver that in one embodiment can be implemented in a Digital Signal Processor, and which can extract the data from a signal sampled at 8,000 Hz.

The present invention demodulates the FSK modulated data, ensures that the data has been received in conditions specified by telephony standards, and verifies the data using an error detection mechanism provided for the transmission of class messages.

An FSK demodulator takes input linear samples of the signal and filters them with a bandpass filter which does an upsampling to increase the sampling rate from 8,000 Hz to 24,000 Hz, which results in 20 samples at the output of the bandpass filter for each incoming data bit. The amplitude of the signal/samples at the output of the bandpass filter is adjusted by an automatic gain control (AGC) circuit and the resulting samples (for convenience referred as sample (t), where t is a discrete moment in time) are processed along two different paths designed to estimate the likelihood of the input signal encoding a mark (mark estimation path) or a space (space estimation path). This "likelihood" is quantitatively represented by a value called ML (most likelihood) estimator which is calculated at the end of each of the two paths based on the formulae:

$$M^2(\omega_i) = \chi^2(\omega_i) + Z^2(\omega_i)$$

where $$\chi(\omega_i) = \sum_{t=t_o}^{t=t_o+19} \text{sample}(t) \cdot \cos(\omega_i t)$$

and $$Z(\omega_i) = \sum_{t=t_o}^{t=t_o+19} \text{sample}(t) \cdot \sin(\omega_i t)$$

where $\omega_i$ is either $\omega_m$ (1200 Hz) for the mark path or $\omega_s$ (2200 Hz) for the space path.

The outputs of the estimators are provided to a slicer, and at the output of the slicer to a decision circuit.

Preferably the two input streams of samples at the input of the ML estimator (mutually phase shifted by 90°) for the space estimation path, are provided to a baud recovery circuit which operates on every pair of samples supplied by the two streams. The baud recover circuit uses 20 sample pairs (the current pair plus the previous 19 pairs) to calculate the ML estimator for the space at every increment in time.

The stream of ML estimators calculated by the baud recovery circuit is low pass filtered, is passed through a threshold circuit and a differentiator which provides an output signal when the slope changes its sign from + to −. The slicer thus is enabled from that output signal to receive the estimated output values from the two ML estimator at the end of the two estimator paths, at particular times which are at the peak of marks or spaces.

The output of the slicer is provided to a decision circuit. A decision as to whether a mark or a space is present is made by the decision circuit, at the instant of slicing, which is at the center of a bit.

The resulting decoded bit is saved if it belongs to a character being received or it is discarded if it is a carrier bit between two successive characters. When a full character (1 start bit+8 data bits+1 stop bit) has been received, the start bit and the stop bit are discarded and the remaining character is saved in a buffer. The last character of a message is a check sum which when added modulo 256 to the previously received characters of the message should result in the combined value 0. If the sum is not zero the whole message is discarded.

More generally, in accordance with the preferred embodiment of the invention, a frequency shift keyed receiver is comprised of apparatus for receiving a demodulated frequency shift keyed sampled sequence of data bits which is frequency shift keyed by upper and lower frequencies $\omega_s$ and $\omega_m$ apparatus for encoding the received sequence with pairs of 90° phase shifted signals of upper frequency $\omega_s$ of the frequency shift keyed sequence and lower frequency $\omega_m$ of the frequency shift keyed sampled sequence resulting in a pair of mutually 90° phase shifted sampled sequence signals encoded by $\omega_s$ and a pair of mutually 90° phase shifted sampled sequence signals encoded by $\omega_m$, a pair of most likely (ML) estimators each for receiving the respective pairs of signals and for continuously operating on the signals to obtain a pair of output signals one representing the likelihood of the upper frequency and one representing the likelihood of the lower frequency sequence having a data bit present, a baud recovery circuit for determining the timing of a mark or space bit and for providing an enable signal corresponding to the timing thereof, a slicer for receiving the output signals and the enable signal and providing amplitude levels of the output signals of the estimators at an input to a decision circuit when enabled, the decision circuit for indicating the higher amplitude one of the estimated output signals.

In accordance with another embodiment a frequency shift keyed receiver is comprised of apparatus for receiving a demodulated frequency shift keyed sampled sequence of mark and space data bits, apparatus for separately operating on 90° phase shifted pairs of the data bits by a process $$M^2(\omega_i) = \chi^2(\omega_i) + Z^2(\omega_i)$$

where $$\chi(\omega_i) = \sum_{t=t_0}^{t=t_0+19} sample(t) \cdot \cos(\omega_i t)$$

and $$Z(\omega_i) = \sum_{t=t_0}^{t=t_0+19} sample(t) \cdot \sin(\omega_i t)$$

in which $\omega_i$ is $\omega_m$ and $\omega_s$ in separate operations, to provide a pair of mark and space estimated signals, apparatus for low pass filtering one of the mark and space estimated signals, apparatus for low pass filtering and differentiating the one signal to obtain a slicer enable signal, slicer apparatus for receiving the estimated signals, and for receiving the enable signal, whereby a slice of the estimated signals at the time of the enable signal is provided at an output, a decision circuit for receiving a slice of the estimated signals, for determining which of the estimated signals is the greater and for providing an indication of the presence of a mark or space bit thereby.

It should be recognized that the term "signal" refers to a digital value (sample), unless specified as an analog signal, since the present invention relates to a digital receiver.

BRIEF INTRODUCTION TO THE DRAWINGS

A better understanding of the invention will be obtained by reference to the detailed description below, in conjunction with the following drawings, in which:

FIG. 1 illustrates the form of a typical class message,
FIG. 2 is a block diagram of the invention,
FIGS. 3A and 3B are plots of the mark and space signals respectively at the outputs of the pair of ML estimators, and
FIGS. 4A and 4B are plots of the mark and space signals respectively either of which is used, after further processing, to enable the slicer in FIG. 2.

DETAILED DESCRIPTION OF THE INVENTION

Figure 1:
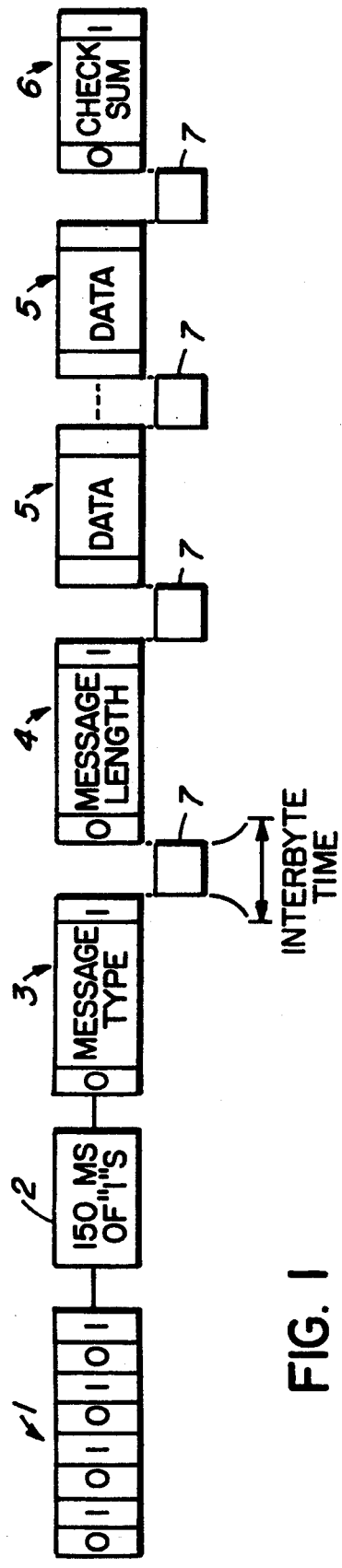

FIG. 1 illustrates schematically a representative form of a class signal. It is typically comprised of a first sequence 1 of bits which sequence is of the form "01010101" for about 250 msec. This signal is used to aid the baud recovery process of a frequency shift keyed (FSK) demodulator, which typically is activated by a 1 to 0 transition. The class signalling scheme typically uses analog, phase-coherent FSK signals for transmission.

An immediately following second data sequence 2 is comprised of a 150±25 msec group of 1's. This sequence facilitates adjustment an automatic gain control of the receiver during this period.

All subsequent sequences are preceded by a 0 and terminated by a 1, and constitute the class message itself.

The first sequence of the class message, i.e. the third data sequence 3 defines the message type, the fourth data sequence 4 defines the message length, and all subsequent sequences 5 except the last define data. The final sequence 6 defines a check sum for the preceding sequences. Each sequence is preferably an eight bit data byte bounded by the aforenoted 0 (space) start bit and a 1 (mark) stop bit.

An inter-byte sequence 7 of marks (1's) is sent between consecutive bytes of a length sufficient to ensure that the maximum interrupt time between two consecutive bytes is no longer than preferably 16.7 msec, and to allow checking that the mark signal is not interrupted for more than 8 msec.

Consequently the receiver first indicates the presence of the first sequence 1, for initialization, then detects the second sequence 2, during which time the AGC of the receiver adjusts its gain factor. The class message itself is then received, first the message type, then the message length, then the data bytes, then the check sum, in an asynchronous protocol as described. The class receiver preferably also checks the presence of the inter-byte carrier, to ensure that the maximum interrupt time between two successive bytes is no longer than 16.7 msec and that the mark signal is not interrupted for more than 8 msec. The data is then evaluated against the check sum for validity in a well known manner.

Figure 2:
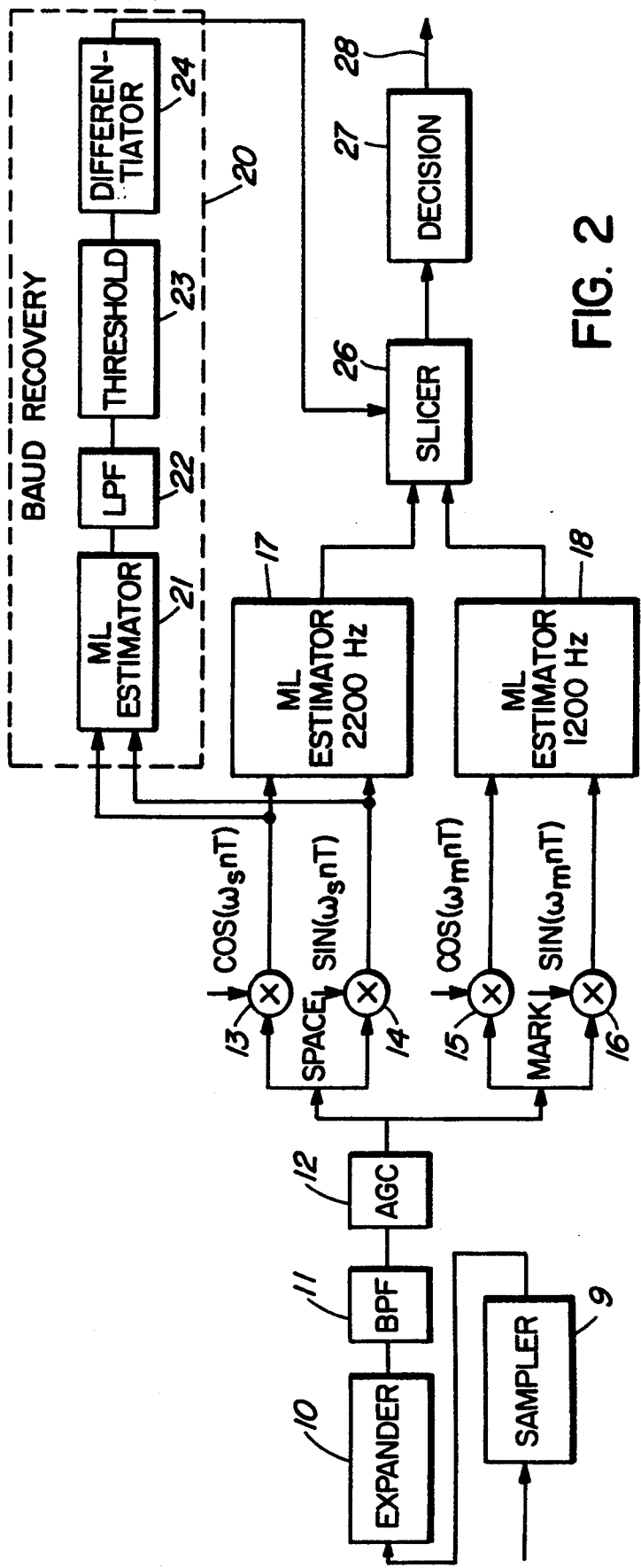

The above description depends on the ability of the receiver to extract the sequence of 0's and 1's from the received signal. A block diagram of a system to extract the sequence is described with reference to FIG. 2.

The input of the receiver is supplied by a sampler 9 (a CODEC) which samples the frequency shift keyed modulated sequence at a rate of e.g. 8,000 Hz (the rate of an inexpensive fixed rate CODEC), and passes it through an expander 10, the output of which is used by the receiver. This sampling rate is not an integral multiple of the baud rate, e.g. 1,200 baud, an example baud rate of the signal referred to above and shown in FIG. 1. The signal is comprised of mark and space signals, the mark signal being at 1,200 Hz and the space signal at 2,200 Hz. The output signal of expander 10 is provided to digital bandpass filter 11 which limits the input signal to the range between 1.1 kHz and 2.3 kHz. This digital filter increases the sampling rate by a factor of 3 to 24,000 Hz, which is a multiple of 1,200 and of 8,000. If the sample rate were not to be increased (e.g. if the 8,000 Hz sampling rate were an integral multiple of 1,200 Hz), then instead of the bandpass filter 11 increasing the sampling rate to a frequency which is an integral factor of the baud rate and sampler 9 sampling rate, a "FIR" filter with fewer coefficients would suffice for the bandpass filter. When a FIR filter is used, the group delay at both encoding frequencies ($\omega_m$=1,200 Hz and $\omega_s$=2,200 Hz) is the same.

The parameters of the FIR digital filter in a laboratory prototype successful embodiment were:
sampling frequency: 24,000 Hz,
number of coefficients: 59
stop band cut-off frequencies: 800 Hz and 2,600 Hz,
pass band cut-off frequencies: 1,100 Hz and 2,300 Hz,
ripple in dB in first stop band: −9.976 dB,
ripple in dB in second stop band: −9,944 dB,
ripple in dB in the pass band: 0.271 dB.
At 24,000 Hz, twenty samples per baud was used.

The output signal of the bandpass filter is applied to an automatic gain control circuit 12 which calculates a gain control factor based on the average of the maximum absolute value of the last twenty samples of the output of the bandpass filter and on a predetermined desirable range of signal amplitudes. The gain control factor is preferably recalculated every sixty samples (and is used as such for the next sixty samples).

The output signal of the AGC circuit is applied to space bit multipliers 13 and 14 and mark bit multipliers 15 and 16. In the space bit multipliers 13 and 14 each input signal thereto is respectively multiplied by 90° phase shifted samples of 2,200 Hz, shown as cos ($\omega_s$nT) and sin ($\omega_s$nT) respectively. The input signal is also multiplied in multipliers 15 and 16 with corresponding mutually 90° phase-shifted 1,200 Hz samples cos ($\omega_m$nT) and sin ($\omega_s$nT) respectively. The output of each pair of multiplexers is applied to a corresponding ML estimator 17 and 18.

Each ML estimator processes the input signals thereto in accordance with the following algorithm:

$$M^2(\omega_i) = \chi^2(\omega_i) + Z^2(\omega_i)$$

where $$\chi(\omega_i) = \sum_{t=t_o}^{t=t_o+19} \text{sample}(t) \cdot \cos(\omega_i t)$$

and $$Z(\omega_i) = \sum_{t=t_o}^{t=t_o+19} \text{sample}(t) \cdot \sin(\omega_i t)$$

where $\omega_i$ represents the mark frequency $\omega_m$ (1,200 Hz) or space frequency $\omega_s$ (2,200 Hz).

Figure 3A:
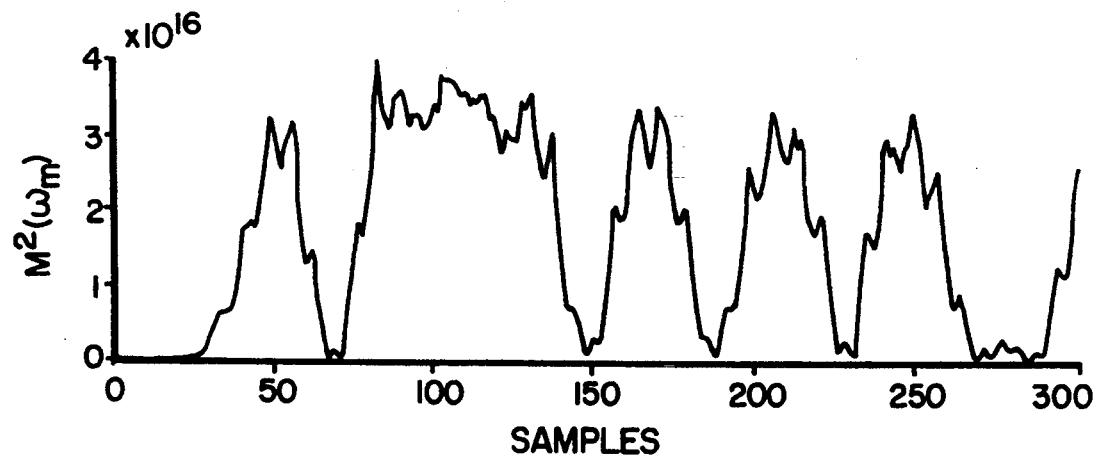
Figure 3B:
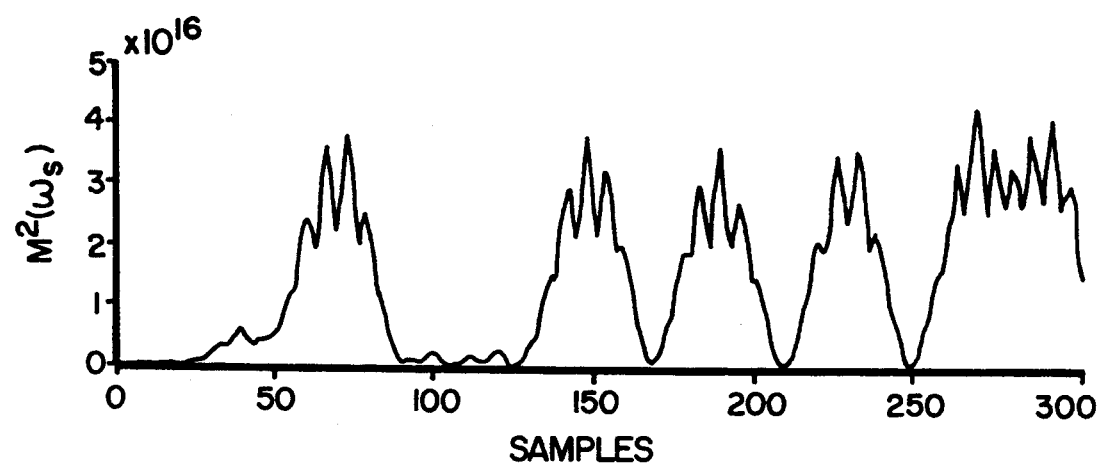

FIGS. 3A and 3B are plots representing the amplitudes of the output signals $M^2(\omega_m)$ and $M^2(\omega_s)$, mark and space, respectively, over 300 samples. It may be seen that the plots are jagged. It is the function of the circuit described below to determine where the samples should be considered as being in the center of a bit.

Considering the plots of FIGS. 3A and 3B, it should be noticed that $M^2(\omega_m)$ reaches its peaks when $M^2(\omega_s)$ reaches its minimums and vice versa. However the plots show that local maxima and minima exist which make the decision process of what is the nature of the bit difficult.

Preferably the orthogonal space signals are applied to a baud recovery circuit 20, to determine the preferred precise instant center of the bit. The signals are applied to a continuous ML estimator 21, which operates on the signals using the same algorithm as does ML estimator 17, as described above. The output of the ML estimator 21, in the form of the signal shown in FIG. 3B, is applied to a low pass filter 22, which is preferably a fourth order elliptical filter. In a successful embodiment, the parameters of the low pass filter 22 included a sampling frequency of 24,000 Hz, a pass band of 0–2.6 kHz with 0.3967 dB ripple and a stop band of 3.6 kHz–12 kHz and ripple of −26.7474 dB.

Figure 4A:
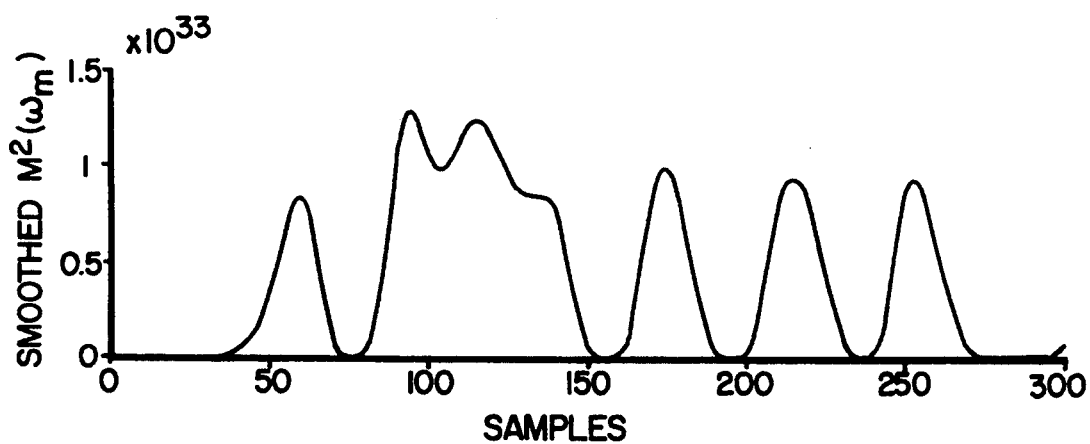
Figure 4B:
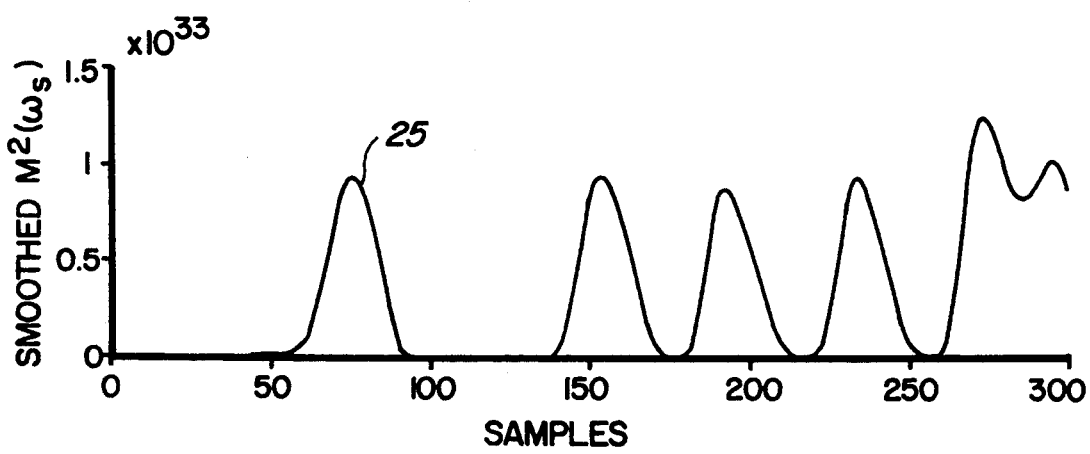

A plot of the output signal from low pass filter 22 is shown in FIG. 4B. If the mark signals had been used to provide baud recovery, a plot of the resulting output signal of the low pass filter 22 is shown in FIG. 4A.

The output signal of low pass filter 22 is applied to a threshold circuit 23. It will be seen from the plot shown in FIG. 4B that it is a much simpler task to determine whether or not the signal is above or below a threshold, than the plot of FIG. 3b.

The output of the threshold circuit 23 is applied to a differentiator 24, which calculates the slope of the signal passing into it.

It may be seen that if all of the space signals in FIG. 4B are of sufficient amplitude to pass through the threshold circuit 23, the function of the differentiator 24 is to determine the exact center of the bit. The differentiator therefore differentiates from a + to a −slope, the zero slope value representing the exact peak 25 of the signals shown in FIG. 4B.

The output of differentiator 24 at the time of the peak 25, is applied to an enable input of a slicer 26. Due to delay in the baud recovery circuit, the enable input is controlled to be delayed by one bit. Slicer 26 receives the output signals of estimators 17 and 18, plots of which are shown in FIGS. 3A and 3B. Slicer 26 provides a signal to decision circuit 27 at the exact instant of peak 25. The signals, (an approximate minimum for the mark ML estimator and an approximate maximum for the space ML estimator or the other way around), thus are presented at the correct instant in time of decision circuit 27 for analysis. The decision circuit determines whether the space ML estimator is greater than the mark ML estimator, and thus indicates that by providing a signal at its output 28 that a 0 (space) has been received.

It is preferred that only one of either the mark or space signals should be analyzed in the ML estimator 21. However the space signal is preferred to be used because the start bit of a transmitted byte (sequence 3, 4, 5 or 6 of FIG. 1) is a space (0), and if an adjustment to an internal clock of the receiver or of other circuits is required as a result of the analysis made by this circuit, this will be provided upon the arrival of a new character. However it will be understood that this circuit can be used for other purposes than the class signal receiver application noted herein, and thus the ML estimation of the mark signal could be analyzed in place of or in addition to analysis of the space signal.

It will be recognized that ML estimator 17 may be used for double duty, i.e. as ML estimator 21. In that case ML estimator 21 is not used, but the output signal of ML estimator 17 is additionally provided to the input of low pass filter 22.

While the above has described the present invention in hardware terms, the process of operation of the hardware constitutes an algorithm of method steps, which may be implemented in software programs or firmware. Each of the hardware functions may be implemented by analogous software or firmware programs.

A person understanding this invention may now conceive of alternative structures and embodiments or variations of the above. All of those which fall within the scope of the claims appended hereto are considered to be part of the present invention.

I claim:

1. A frequency shift keyed receiver comprising:
    (a) means for receiving a demodulated frequency shift keyed sampled sequence of data bits which is frequency shift keyed by upper and lower frequencies $\omega_s$ and $\omega_m$,
    (b) means for encoding the received sequence with pairs of 90° phase shifted signals of upper frequency $\omega_s$ of said frequency shift keyed sampled sequence and lower frequency $\omega_m$ of said frequency shift keyed sampled sequence resulting in a pair of mutually 90° phase shifted sampled sequence signals encoded by $\omega_s$ and a pair of mutually 90° phase shifted sampled sequence signals encoded by $\omega_m$,
    (c) a pair of most likely (ML) estimators each for receiving a corresponding pair of phase shifted sampled sequence signals and for continuously operating on said pairs of phase shifted sampled sequence signals to obtain a pair of output signals one representing the likelihood of the upper frequency and one representing the likelihood of the lower frequency sequence having a data bit present, (d) a baud recovery circuit for determining the timing of a mark or space bit and for providing an enable signal corresponding to the timing thereof, (e) a slicer for receiving said output signals and the enable signal and providing amplitude levels of the output signals at an input to a decision circuit when enabled, (f) said decision circuit indicating the higher amplitude one of said output signals.

2. A frequency shift keyed receiver as defined in claim 1 in which said baud recovery circuit is comprised of means for operating on one of said pair of signals to obtain an output signal representing the likelihood of either a mark or a space bit being present, a filter for receiving said output signal, a threshold circuit for receiving the filtered signal, and means for providing an output signal from the threshold circuit to an enable input of the slicer for enabling the slicer at particular times to pass output signals of said pair of ML estimators, whereby the decision circuit is provided with signals from the slicer representing the likelihood mark and space signals being present at particular times, thereby facilitating a decision to be made based on relative amplitudes thereof.

3. A frequency shift keyed receiver as defined in claim 2, wherein said means for providing a signal to an enable input of said slicer is comprised of a differentiator interposed between the threshold circuit and slicer for providing said output signal of the threshold circuit to said slicer as a differentiated filtered signal.

4. A frequency shift keyed receiver as defined in claim 3 in which the pair of said signals received by said baud recovery circuit represents the presence of a space.

5. A frequency shift keyed receiver as defined in claim 3, in which the ML estimates operate on the signals received thereby by a process $$M^2(\omega_i) = \chi^2(\omega_i) + Z^2(\omega_i)$$

where $$\chi(\omega_i) = \sum_{t=t_o}^{t=t_o+19} \text{sample}(t) \cdot \cos(\omega_i t)$$

and $$Z(\omega_i) = \sum_{t=t_o}^{t=t_o+19} \text{sample}(t) \cdot \sin(\omega_i t)$$

where for a 2 frequency shift case $\omega_i$ can take the 2 frequency values, and in which the slicer is enabled when $M^2(\omega_i)$ is maximum for $\omega_i = \omega_m$ or $\omega_i = \omega_s$.

6. A frequency shift keyed receiver as defined in claim 5 in which the data bits are sampled in a sampler which operates at a non-integral multiple of the baud rate, for supplying said sampled sequence.

7. A frequency shift keyed receiver as defined in claim 5 in which the baud rate of said data bits is 1,200 baud, and in which the data bits are sampled in a sampler having a sampling rate to supply said sampled sequence at 8,000 Hz.

8. A frequency shift keyed receiver as defined in claim 1 in which the baud rate of said data bits has a first value and in which said means for receiving is comprised of a sampler for sampling the data bits with a sampling rate to supply the sampled sequence at a frequency having a second value higher than the first value, and further including a band pass filter for sampling the sampled sequence at a rate into which said first and second values divide by a whole number, and for providing said sampled sequence of data bits.

9. A frequency shift keyed receiver as defined in claim 7, further including a band pass filter for sampling the sampled sequence at a rate into which said baud rate and sampled sequence frequency divide by a whole number.

10. A frequency shift keyed receiver as defined in claim 9, in which the sampling rate of the band pass filter is 24,000 Hz.

11. A frequency shift keyed receiver as defined in claim 6, further including a band pass filter for sampling the sampled sequence at a rate into which said baud rate and sampled sequence frequency divide by a whole number.

12. A receiver as defined in claim 9 further including an expander for applying an output signal of the sampler to an input of the band pass filter.

13. A frequency shift keyed receiver comprising:

(a) means for receiving a demodulated frequency shift keyed sampled sequence of mark and space data bits, (b) means for separately operating on 90° phase shifted pairs of said data bits by a process $$M^2(\omega_i) = X^2(\omega_i) + Z^2(\omega_i)$$

where $$X(\omega_i) = \sum_{t=t_o}^{t=t_o+19} \text{sample}(t) \cdot \cos(\omega_i t)$$

and $$Z(\omega_i) = \sum_{t=t_o}^{t=t_o+19} \text{sample}(t) \cdot \sin(\omega_i t)$$

in which $\omega_i$ is $\omega_m$ and $\omega_s$ in separate operations, to provide a pair of mark and space estimated signals, wherein $\omega_m$ is a lower frequency and $\omega_s$ is an upper frequency, (d) means for low pass filtering one of said mark and space estimated signals, (e) means for differentiating said one signal to obtain a slicer enable signal at the times when the slope of the low pass filtered said one signal changes from a positive to a 0 slope prior to changing to a negative slope, (f) slicer means for receiving said estimated signals, and for receiving said enable signal, whereby a slice of said estimated signals at the time of said enable signal is provided at an output, (g) a decision circuit for receiving said slice of said estimated signals, for determining which of the estimated signals is the greater and for providing an indication of the presence of a mark or space bit thereby.

14. A frequency shift keyed receiver as defined in claim 13 in which said one of said estimated signals is a space signal.

15. A frequency shift keyed receiver as defined in claim 14 further comprising a threshold means for providing said low pass filtered one signal to said differentiating means when said low pass filter filtered one signal exceeds a predetermined level.

16. A frequency shift keyed receiver as defined in claim 13 in which the baud rate of said data bits has a first value and in which said means for receiving is comprised of a sampler for sampling the data bits with a sampling rate to supply the sampled sequence at a frequency having a second value higher than the first value, and further including a band pass filter for sampling the sampled sequence at a rate into which said first and second values divide by a whole number, and for providing said sampled sequence of data bits.

17. A receiver as defined in claim 16 further including an expander for applying an output signal of the sampler to an input of the band pass filter.

18. A frequency shift keyed receiver as defined in claim 17 in which said one of said estimated signals is a space signal.

19. A frequency shift keyed receiver as defined in claim 18 further comprising a threshold means for providing said low pass filtered one signal to said differentiating means when said low pass filter filtered one signal exceeds a predetermined level.

* * * * *